(12) United States Patent
Lee et al.

(10) Patent No.: US 9,180,863 B2
(45) Date of Patent: Nov. 10, 2015

(54) OIL PUMP SYSTEM OF HYBRID VEHICLE AND METHOD FOR CONTROLLING THE SAME

(71) Applicants: Hyundai Motor Company, Seoul (KR); Kia Motors Corporation, Seoul (KR)

(72) Inventors: Haksung Lee, Whasung-Si (KR); SangLok Song, Whasung-Si (KR); Jang Mi Lee, Whasung-Si (KR); Gyeongcheol Kim, Whasung-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 84 days.

(21) Appl. No.: 14/102,112

(22) Filed: Dec. 10, 2013

(65) Prior Publication Data

US 2014/0365091 A1  Dec. 11, 2014

(30) Foreign Application Priority Data

Jun. 11, 2013  (KR) .......................... 10-2013-0066783

(51) Int. Cl.
| | |
|---|---|
| *B60W 10/04* | (2006.01) |
| *B60W 10/10* | (2012.01) |
| *B60W 10/30* | (2006.01) |
| *F16H 61/00* | (2006.01) |

(52) U.S. Cl.
CPC ........... *B60W 10/30* (2013.01); *F16H 61/0031* (2013.01); *B60W 2710/1083* (2013.01)

(58) Field of Classification Search
CPC ..... B60W 10/04; B60W 10/10; B60W 10/30; B60W 20/50; B60W 2510/30; B60W 2710/30

USPC ............................................................ 701/53
See application file for complete search history.

(56) References Cited

U.S. PATENT DOCUMENTS

| | | | | |
|---|---|---|---|---|
| 5,944,632 | A * | 8/1999 | Hara et al. ..................... | 477/158 |
| 6,952,057 | B2 * | 10/2005 | Tajima et al. ................ | 290/40 C |
| 7,666,115 | B2 | 2/2010 | Ito et al. | |
| 2010/0143156 | A1 * | 6/2010 | Kong ........................... | 417/44.1 |

FOREIGN PATENT DOCUMENTS

| | | |
|---|---|---|
| JP | 2005-206021 A | 8/2005 |
| JP | 2007-198439 A | 8/2007 |
| JP | 2008-255835 A | 10/2008 |

(Continued)

*Primary Examiner* — Edwin A Young
(74) *Attorney, Agent, or Firm* — Morgan, Lewis & Bockius LLP

(57) ABSTRACT

An oil pump system and method of a hybrid vehicle stably supplies an operating hydraulic pressure to an automatic transmission using only an electric oil pump. The oil pump system of the hybrid vehicle, which supplies an operating hydraulic pressure to an automatic transmission of the hybrid vehicle, includes: an automatic transmission control unit controlling operation of the automatic transmission; an electric oil pump pumping oil to generate an operating hydraulic pressure which is to be supplied to the automatic transmission; and an oil pump control unit receiving information on a state of the automatic transmission from the automatic transmission control unit and controlling operation of the electric oil pump. The operating hydraulic pressure supplied to the automatic transmission may be generated solely through the electric oil pump which is electrically operated.

11 Claims, 2 Drawing Sheets

(56) References Cited

FOREIGN PATENT DOCUMENTS

| JP | 2010-149683 | A | 7/2010 |
| JP | 2011-195102 | A | 10/2011 |
| KR | 1999-0059872 | A | 7/1999 |
| KR | 10-1173050 | B1 | 6/2011 |

* cited by examiner

OIL PUMP SYSTEM OF HYBRID VEHICLE AND METHOD FOR CONTROLLING THE SAME

CROSS-REFERENCE TO RELATED APPLICATION

The present application claims priority of Korean Patent Application No. 10-2013-0066783 filed Jun. 11, 2013, the entire contents of which application is incorporated herein for all purposes by this reference.

BACKGROUND OF INVENTION

1. Field of Invention

The present invention relates to an oil pump system of a hybrid vehicle and a method for controlling the same, and more particularly, to an oil pump system of a hybrid vehicle, which is provided to supply a hydraulic pressure to an automatic transmission using only an electric oil pump, and a method for controlling the same.

2. Description of Related Art

In general, an automatic transmission is connected to an oil pump system for supplying an operating hydraulic pressure to the automatic transmission. The oil pump system includes one or more oil pumps.

Conventionally, an oil pump system which supplies an operating hydraulic pressure to an automatic transmission using a mechanical oil pump and an electric oil pump together has been mainly used. In particular, hybrid vehicles have mainly employed a control method of an oil pump system, which divides a running state of a vehicle into a stoppage section, a low-speed section, and a high-speed section, and selectively operates a mechanical oil pump and an electric oil pump. According to the control method of the oil pump system, only the electric oil pump may be operated during the stoppage section, the mechanical oil pump and the electric oil pump may be simultaneously operated during the low-velocity section, and only the mechanical oil pump may be operated during the high-velocity section.

However, when two or more oil pumps such as the mechanical oil pump and the electric oil pump are used, the production cost may excessively increase. Furthermore, the mechanical oil pump operated by driving torque of an engine may serve as a factor having a bad influence on the fuel efficiency of the vehicle. When one of the mechanical oil pump and the electric oil pump is omitted, an operating hydraulic pressure may not be stably supplied to the automatic transmission. In particular, when only the electric oil pump is used, it is not easy to perform a control operation for dealing with a defect which may occur in supplying a hydraulic pressure to the automatic transmission, due to a trouble of a solenoid or the like. Furthermore, when a hydraulic pressure required for the electric oil pump is set to be fixed to an excessively high hydraulic pressure at the time at which a hydraulic pressure supply defect occurs, power may be wasted to drive the electric oil pump, and parts may be damaged by over-current.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an oil pump system of a hybrid vehicle, which is capable of stably supplying an operating hydraulic pressure to an automatic transmission using only an electric oil pump, and a method for controlling the same.

The present invention has also been made in an effort to provide an oil pump system of a hybrid vehicle, which is capable of minimizing power waste even when a defect occurs in supplying a hydraulic pressure to an automatic transmission, and a method for controlling the same.

Various aspects of the present invention provide for an oil pump system of a hybrid vehicle, which supplies an operating hydraulic pressure to an automatic transmission of the hybrid vehicle. The oil pump system includes: an automatic transmission control unit controlling operation of the automatic transmission; an electric oil pump pumping oil to generate an operating hydraulic pressure which is to be supplied to the automatic transmission; and an oil pump control unit receiving information on a state of the automatic transmission from the automatic transmission control unit and controlling operation of the electric oil pump.

The operating hydraulic pressure supplied to the automatic transmission may be generated only through the electric oil pump which is electrically operated.

When a hydraulic pressure supply defect occurs in the automatic transmission, the oil pump control unit may perform control to constantly fix the operating hydraulic pressure of the automatic transmission, which is generated through the electric oil pump.

The constantly-fixed operating hydraulic pressure may be set to be equal to or more than an operating hydraulic pressure generated through a normal operation of the electric oil pump.

When the operating hydraulic pressure of the automatic transmission is controlled to be constantly fixed, the automatic transmission control unit may perform control to reduce output torque required for the automatic transmission.

The electric oil pump may be controlled to an RPM corresponding to a required operating hydraulic pressure of the automatic transmission, which is reduced according to the reduced output torque of the automatic transmission.

The RPM of the electric oil pump may be set by a map on relationship among oil temperature, hydraulic pressure, and the RPM of the electric oil pump, which is stored in the oil pump control unit.

Various aspects of the present invention provide for a method for controlling an oil pump system which supplies an operating hydraulic pressure to an automatic transmission of a hybrid vehicle using an electric oil pump. The method includes: determining whether or not a hydraulic pressure supply defect occurred in the automatic transmission; fixing the operating hydraulic pressure supplied to the automatic transmission; reducing output torque required for the automatic transmission; and controlling an RPM of the electric oil pump.

When it is determined that no hydraulic pressure supply defect occurred in the automatic transmission, the electric oil pump may be normally operated.

When it is determined that a hydraulic pressure supply defect occurred in the automatic transmission, the operating hydraulic pressure supplied to the automatic transmission may be fixed.

When the operating hydraulic pressure supplied to the automatic transmission is fixed, the output torque required for the automatic transmission may be reduced.

A required operating hydraulic pressure of the automatic transmission may decrease according to the reduced output torque of the automatic transmission, and the RPM of the electric oil pump may be controlled as the required operating hydraulic pressure of the automatic transmission decreases.

The RPM of the electric oil pump may be controlled to an RPM set by a map on relationship among the electric oil pump, oil temperature, and hydraulic pressure.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
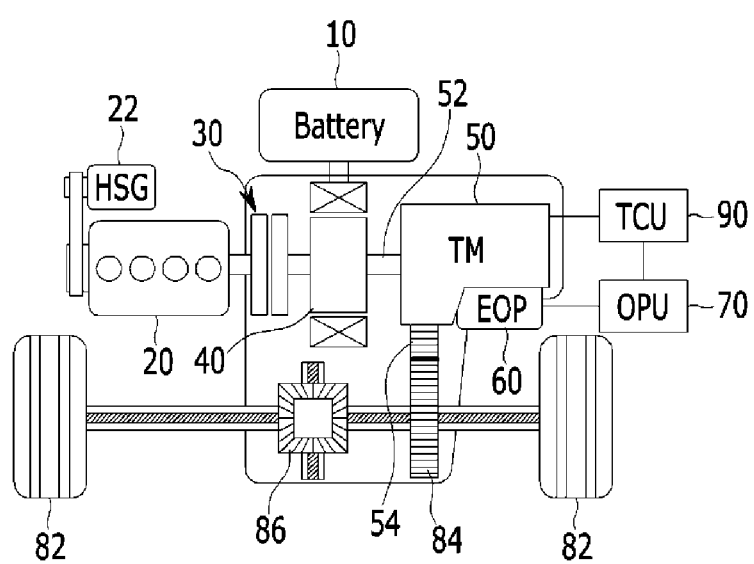
FIG. 1 is a schematic diagram of an exemplary oil pump system of a hybrid vehicle according to the present invention.

FIG. 1 is a schematic diagram of an oil pump system of a hybrid vehicle according to various embodiments of the present invention.

As illustrated in FIG. 1, the oil pump system of the hybrid vehicle according to various embodiments of the present invention includes an automatic transmission 50, a transmission control unit (TCU) 90, an electric oil pump (EOP) 60, and an electric oil pump unit (OPU) 70. Furthermore, a power train system of the hybrid vehicle includes an engine 20, a hybrid starter and generator (HSG) 22, a motor 40, a battery 10, an engine clutch 30, an automatic transmission 50, and an axle 80.

Power transmission of the hybrid vehicle is performed as follows. Power generated from the engine 20 or the motor 40 is selectively transmitted to an input shaft 52 of the automatic transmission 50, and power output to an output stage 54 of the automatic transmission 50 is transmitted to the axle 80 through a final reduction device 84 and a differential gear device 86. Furthermore, as the axle 80 rotates wheels 82, the hybrid vehicle is operated through the power generated from the engine 20 or the motor 40.

The battery 10 supplies a driving voltage to the motor 40. That is, the battery 10 stores a high voltage. Furthermore, the HSG 22 operates as a motor to start the engine 20 or operates as a generator in a state where the engine 20 is driven, thereby charging the battery 10. The battery 10 may also be charged through energy regenerated by the motor 40 during a coasting operation of the hybrid vehicle. Furthermore, the engine clutch 30 selectively connects the engine 20 and the motor 40. That is, the powers of the engine 20 and the motor 40 are connected or blocked by the engine clutch 30.

The power transmission and regenerative braking of the hybrid vehicle and a fluid clutch (not illustrated) for selectively blocking power transmitted to the automatic transmission 50 are obvious to a person of an ordinary skill in the art. Thus, the detailed descriptions thereof are omitted herein.

The automatic transmission 50 serves to change speed by changing a gear ratio of the input shaft 52 to the output stage 54. Furthermore, the automatic transmission 50 changes speed according to operations of a plurality of friction elements including one or more brakes (not illustrated) and one or more clutches (not illustrated). The plurality of friction elements are operated to be coupled or decoupled by an operating hydraulic pressure supplied to the automatic transmission 50.

The TCU 90 serves to control torque of the automatic transmission 50 and the operation of the friction elements. Since the operations of the TCU 90 and the automatic transmission 50 are obvious to a person of an ordinary skill in the art, the detailed descriptions thereof are omitted herein.

The oil pump system of the hybrid vehicle may properly supply an operating hydraulic pressure for operating the friction elements of the automatic transmission 50, in order to smoothly perform the power transmission of the hybrid vehicle.

The electric oil pump 60 is connected to the automatic transmission 50. Furthermore, the electric oil pump 60 may be embedded in the automatic transmission 50. The electric oil pump 60 pumps oil to supply an operating hydraulic pressure to the automatic transmission 50. In the oil pump system of the hybrid vehicle according to various embodiments of the present invention, only the electric oil pump 60 generates an operating hydraulic pressure, and supplies the generated operating hydraulic pressure to the automatic transmission 50.

The OPU 70 is connected to the electric oil pump 60, and controls the drive of the electric oil pump 60. Furthermore, the OPU 70 is connected to the TCU 90, and controls the drive of the electric oil pump 60 according to information on the state of the automatic transmission 50, which is received from the TCU 90.

Hereafter, referring to FIG. 2, a method for controlling the oil pump system of the hybrid vehicle according to various embodiments of the present invention will be described.

Figure 2:
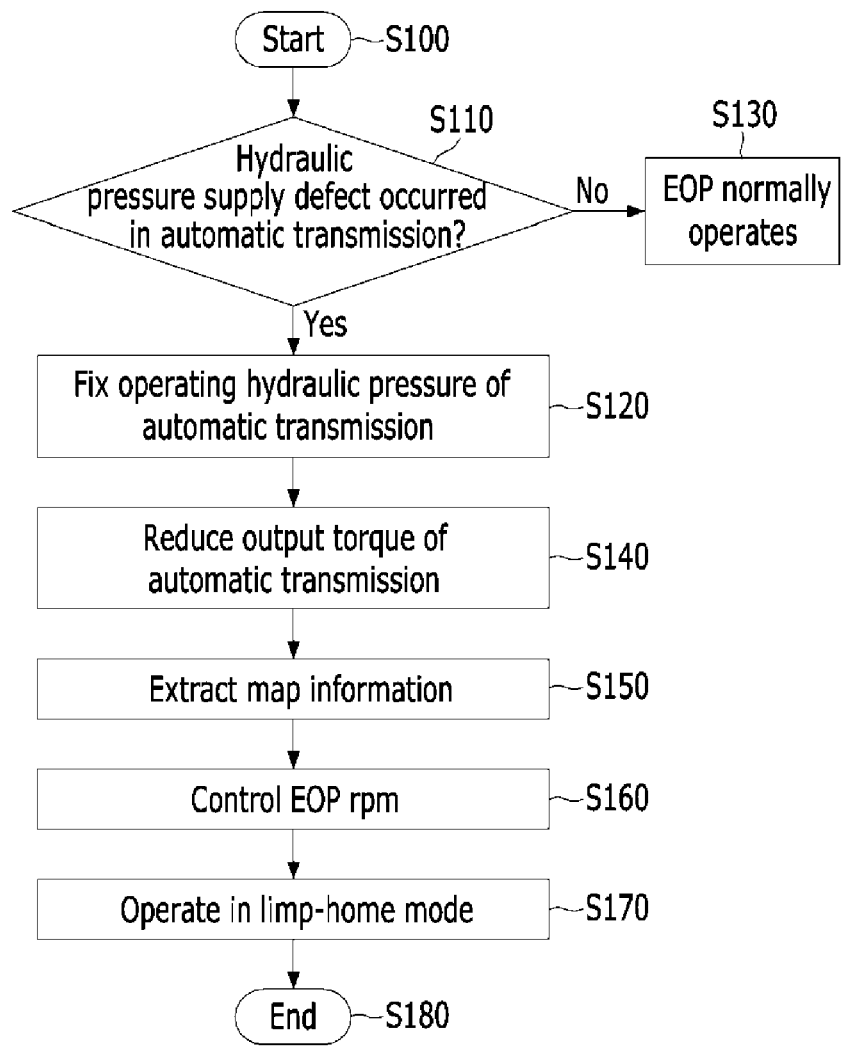
FIG. 2 is a flow chart for explaining an exemplary method for controlling the oil pump system of the hybrid vehicle according to the present invention.

FIG. 2 is a flow chart for explaining the method for controlling the oil pump system of the hybrid vehicle according to various embodiments of the present invention.

When the oil pump system of the hybrid vehicle is operated (S100), the TCU 90 determines whether or not a hydraulic pressure supply defect occurred in the automatic transmission 50 (S110). For example, the hydraulic pressure supply defect may include a trouble of a solenoid (not illustrated) which supplies a hydraulic pressure to the friction elements.

When it is determined that no hydraulic pressure supply defect occurred in the automatic transmission 50, the TCU 90 transmits information on the normal state of the automatic transmission 50 to the OPU 70. Furthermore, the OPU 70 controls the electric oil pump 60 to normally operate (S130). The normal operation of the electric oil pump 60 may be set by a person of an ordinary skill in the art, based on the generated operating hydraulic pressure.

When it is determined that a hydraulic pressure supply defect occurred in the automatic transmission 50, the TCU 90 transfers information on the hydraulic pressure supply defect state of the automatic transmission 50 to the OPU 70. Furthermore, the OPU 70 controls the drive of the electric oil pump 60 to constantly fix the operating hydraulic pressure supplied to the automatic transmission 50 from the electric oil pump 60 (S120). The constantly-fixed operating hydraulic pressure is set to be equal to or more than an operating hydraulic pressure generated through the normal operation of the electric oil pump 60. For example, when the operating hydraulic pressure generated through the normal operation of the electric oil pump 60 varies in the range of 11 bar to 16 bar, the operating hydraulic pressure in the hydraulic pressure supply defect state of the automatic transmission 50 may be fixed to 16 bar or more.

However, when the operating hydraulic pressure is continuously fixed to more than the operating hydraulic pressure generated through the normal operation of the electric oil pump 60 for a predetermined time, an operating hydraulic pressure higher than needed may be supplied, power may be wasted to drive the electric oil pump 60, and parts may be damaged by over-current.

Thus, when the operating hydraulic pressure supplied to the automatic transmission 50 is constantly fixed (S120), the TCU 90 performs control to reduce output torque of the automatic transmission 50 (S140). When the output torque of the automatic transmission 50 is reduced, the operating hydraulic pressure required from the automatic transmission 50 may be reduced. The reduced output torque and the reduced required operating hydraulic pressure are set by a person of an ordinary skill in the art.

Hereinafter, the reduced output torque will be referred to as a limit torque, and the reduced required operating hydraulic pressure will be referred to as a limit hydraulic pressure. The limit torque is set in a range where the power transmission of the automatic transmission 50 is smoothly performed. Furthermore, the limit hydraulic pressure set according to the limit torque is set in a range where the electric oil pump 60 is smoothly driven.

When the output torque of the automatic transmission 50 is reduced (S140) and the limit torque and the limit hydraulic pressure are set, the OPU 70 extracts information from a map (S150). The OPU 70 controls the RPM of the electric oil pump 60 according to the information extracted from the map (S160). The map stores information on the relationship among oil temperature, hydraulic pressure, and the RPM of the electric oil pump 60. That is, when the information of the map is used, the RPM of the electric oil pump 60 may be set according to the limit hydraulic pressure and the current oil temperature.

When the RPM of the electric oil pump 60 is controlled (S160), the hybrid vehicle is operated in a limp-home mode (S170), and the control for the oil pump system of the hybrid vehicle is ended (S180).

According to the embodiment of the present invention, as only the electric oil pump 60 is used, the production cost may be reduced, and the fuel efficiency may be improved. Furthermore, as the map about oil temperature, hydraulic pressure, and the RPM of the electric oil pump 60 is used, the hydraulic pressure may be stably supplied even when a defect occurs in supplying the hydraulic pressure to the automatic transmission 50, and the waste of power may be minimized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil pump system of a hybrid vehicle, which supplies an operating hydraulic pressure to an automatic transmission of the hybrid vehicle, the oil pump system comprising:
   an automatic transmission control unit controlling operation of the automatic transmission;
   an electric oil pump pumping oil to generate an operating hydraulic pressure which is supplied to the automatic transmission; and
   an oil pump control unit receiving information regarding a state of the automatic transmission from the automatic transmission control unit and controlling operation of the electric oil pump,
   wherein the operating hydraulic pressure supplied to the automatic transmission is generated only through the electric oil pump which is electrically operated, and
   wherein when a hydraulic pressure supply defect occurs in the automatic transmission,
   the oil pump control unit performs control to maintain the operating hydraulic pressure of the automatic transmission at a constant operating hydraulic pressure, which is generated through the electric oil pump.

2. The oil pump system of claim 1, wherein:
   the constant operating hydraulic pressure is set equal to or more than an operating hydraulic pressure generated through a normal operation of the electric oil pump.

3. The oil pump system of claim 1, wherein:
   when the operating hydraulic pressure of the automatic transmission is controlled at a substantially constant pressure, the automatic transmission control unit performs control to reduce output torque required for the automatic transmission.

4. The oil pump system of claim 3, wherein the electric oil pump is controlled to an RPM corresponding to a required operating hydraulic pressure of the automatic transmission, which is reduced according to the reduced output torque of the automatic transmission.

5. The oil pump system of claim 4, wherein:
   the RPM of the electric oil pump is set by a map on relationship among an oil temperature, a hydraulic pressure, and the RPM of the electric oil pump, which is stored in the oil pump control unit.

6. A method for controlling an oil pump system which supplies an operating hydraulic pressure to an automatic transmission of a hybrid vehicle using an electric oil pump, the method comprising:
   determining whether or not a hydraulic pressure supply defect occurred in the automatic transmission;
   fixing the operating hydraulic pressure supplied to the automatic transmission;
   reducing output torque required for the automatic transmission; and
   controlling an RPM of the electric oil pump.

7. The method of claim 6, wherein when it is determined that the hydraulic pressure supply defect did not occur in the automatic transmission, the electric oil pump is normally operated.

8. The method of claim 6, wherein when it is determined that the hydraulic pressure supply defect occurred in the automatic transmission,
   the operating hydraulic pressure supplied to the automatic transmission is fixed.

9. The method of claim 8, wherein when the operating hydraulic pressure supplied to the automatic transmission is fixed, the output torque required for the automatic transmission is reduced.

10. The method of claim 6,
wherein a required operating hydraulic pressure of the automatic transmission decreases according to the reduced output torque of the automatic transmission, and
wherein the RPM of the electric oil pump is controlled as the required operating hydraulic pressure of the automatic transmission decreases.

11. The method of claim 6, wherein:
the RPM of the electric oil pump is controlled to an RPM set by a map on relationship among the electric oil pump, an oil temperature, and a hydraulic pressure.

\* \* \* \* \*